(12) United States Patent
Mowers et al.

(10) Patent No.: US 12,224,648 B2
(45) Date of Patent: Feb. 11, 2025

(54) BRAKE FOR ENERGY STORAGE DEVICE

(71) Applicant: Deere & Company, Moline, IL (US)

(72) Inventors: Lashun R. Mowers, Independence, KS (US); Randall L. Long, Coffeyville, KS (US); Stacy K. Worley, Coffeyville, KS (US)

(73) Assignee: DEERE &COMPANY, Moline, IL (US)

( * ) Notice: Subject to any disclaimer, the term of this patent is extended or adjusted under 35 U.S.C. 154(b) by 66 days.

(21) Appl. No.: 17/452,268

(22) Filed: Oct. 26, 2021

(65) Prior Publication Data

US 2023/0126557 A1 Apr. 27, 2023

(51) Int. Cl.

| | |
|---|---|
| *F03G 3/08* | (2006.01) |
| *E02F 9/20* | (2006.01) |
| *F16D 49/00* | (2006.01) |
| *F16D 65/18* | (2006.01) |
| *H02K 7/02* | (2006.01) |
| *H02K 7/102* | (2006.01) |
| *H02K 21/24* | (2006.01) |
| *B60K 6/10* | (2006.01) |
| *B60K 6/40* | (2007.10) |

(52) U.S. Cl.
CPC ............ *H02K 7/102* (2013.01); *E02F 9/207* (2013.01); *F03G 3/08* (2013.01); *F16D 49/00* (2013.01); *F16D 65/18* (2013.01); *H02K 7/02* (2013.01); *H02K 7/025* (2013.01); *H02K 21/24* (2013.01); *B60K 6/105* (2013.01); *B60K 6/40* (2013.01)

(58) Field of Classification Search
CPC .......... H02K 7/102; H02K 7/02; H02K 21/24; H02K 7/025; F03G 3/08; F16D 49/00; F16D 65/18; B60K 6/105; B60K 6/40; E02F 9/207
See application file for complete search history.

(56) References Cited

U.S. PATENT DOCUMENTS 5,931,249 A * 8/1999 Ellis .................... B60K 1/02
                                               180/312
10,631,464 B2   4/2020 Gresch et al.
(Continued)

FOREIGN PATENT DOCUMENTS

CN    108551247 A  *  9/2018  ............. H02K 1/165
CN    212649301 U     3/2021
(Continued)

OTHER PUBLICATIONS

EP3731384A1 English translation (Year: 2023).*
(Continued)

*Primary Examiner* — Christopher M Koehler
*Assistant Examiner* — Viswanathan Subramanian
(74) *Attorney, Agent, or Firm* — KLINTWORTH & ROZENBLAT IP LLP (57) ABSTRACT

An energy storage device is mounted at a horizontal end of a work vehicle for storing energy generated from operation of the work vehicle. The energy storage device includes a stator of an electric machine having a stator axis, a rotor of the electric machine fixed for rotation with a rotating ballast and configured for rotation about the stator axis, a housing disposed around the rotor and configured to contain the electric machine, and a brake configured to absorb kinetic energy of the rotor.

18 Claims, 8 Drawing Sheets

(56) References Cited

U.S. PATENT DOCUMENTS

| | | | |
|---|---|---|---|
| 2004/0178009 A1* | 9/2004 | Pavlykivskyj | B60L 50/30 180/65.1 |
| 2007/0213158 A1 | 9/2007 | Laeuffer | |
| 2018/0116125 A1 | 5/2018 | Gresch et al. | |
| 2018/0367004 A1 | 12/2018 | Xu et al. | |
| 2019/0199164 A1 | 6/2019 | Gieras et al. | |
| 2020/0156500 A1 | 5/2020 | Huff et al. | |
| 2021/0180251 A1 | 6/2021 | Aronen | |
| 2022/0126816 A1 | 4/2022 | Von Holst et al. | |

FOREIGN PATENT DOCUMENTS

| | | | | |
|---|---|---|---|---|
| CN | 112600357 A | | 4/2021 | |
| CN | 112383194 B | | 8/2022 | |
| DE | 1053083 B | | 3/1959 | |
| DE | 2629439 A1 | | 1/1978 | |
| DE | 3637591 A1 | | 6/1988 | |
| DE | 102011080239 A1 | | 2/2013 | |
| DE | 102016204827 A1 | | 9/2017 | |
| DE | 102016221311 A1 | | 5/2018 | |
| DE | 102019205789 A1 | | 10/2020 | |
| DE | 102020115365 B3 | | 6/2021 | |
| DE | 102020104575 A1 | | 8/2021 | |
| DE | 102020114855 B3 | | 9/2021 | |
| EP | 2998167 B1 | | 3/2017 | |
| EP | 3731384 A1 | * | 10/2020 | B21C 47/003 |
| EP | 2998167 A1 | | 3/2023 | |
| JP | H0720079 A | | 1/1995 | |
| JP | H0720079 U | | 4/1995 | |
| JP | 2004166369 A | | 6/2004 | |
| JP | 2008048519 A | | 2/2008 | |

OTHER PUBLICATIONS

EP2998167A1 English translation (Year: 2023).*
DE3637591A1 English translation (Year: 2023).*
CN108551247A English translation (Year: 2023).*
German Search Report issued in application No. DE102022208837.9 dated Apr. 5, 2023 (12 pages).
German Search Report issued in application No. DE102022208835.2 dated Apr. 4, 2023 (10 pages).
German Search Report issued in application No. DE102022208836.0 dated Apr. 4, 2023 (10 pages).
German Search Report issued in application No. DE102022208886.7 dated Apr. 5, 2023 (12 pages).
United States Office Action, U.S. Appl. No. 17/452,261, Jan. 25, 2024, 19 pages.
United States Office Action, U.S. Appl. No. 17/452,262, Feb. 6, 2024, 17 pages.
USPTO Final Office Action issued in U.S. Appl. No. 17/452,262, Jul. 18, 2024, 49 pages.
USPTO Non-Final Office Action issued in U.S. Appl. No. 17/452,261, Aug. 15, 2024, 42 pages.
USPTO Non-Final Office Action issued in U.S. Appl. No. 17/938,380, Sep. 16, 2024, 40 pages.
USPTO Final Office Action issued in U.S. Appl. No. 17/452,261, Oct. 10, 2024, 108 pages.

* cited by examiner

BRAKE FOR ENERGY STORAGE DEVICE

BACKGROUND

Work vehicles, such as agricultural and construction machines, may include added ballast weight at one or more locations of the vehicle in order to improve weight distribution, operability, traction, and/or other features or functions of the work vehicle. As significant energy may be required to move the work vehicle or otherwise allow its operation, the work vehicle benefits from increased capacity and conservation of energy of the work vehicle, especially where ballast weight of the work vehicle increases the overall weight of the work vehicle during operation.

SUMMARY

Various aspects of examples of the present disclosure are set out in the claims.

In an embodiment of the present disclosure, an energy storage device mounted at a horizontal end of a work vehicle for storing energy generated from operation of the work vehicle includes a stator of an electric machine having a stator axis, a rotor of the electric machine fixed for rotation with a rotating ballast and configured for rotation about the stator axis, a housing disposed around the rotor and configured to contain the electric machine, and a brake disposed at an outer surface of the rotor and configured to absorb kinetic energy of the rotor upon contact of the brake with the housing.

The rotor may be configured for rotation around the stator. The rotor may be axially spaced from the stator. The rotor may be both axially and radially spaced from the stator. The brake may include a surface having a camber such that a surface area of the brake being contacted increases based on a decrease of spacing between the rotor and the housing. The brake may further include an electrical control system configured to determine spacing between the rotor and the housing and activate a braking operation based on such spacing.

In an embodiment of the present disclosure, an energy storage device mounted at a horizontal end of a work vehicle for storing energy generated from operation of the work vehicle includes a stator of an electric machine having a stator axis, a rotor of the electric machine fixed for rotation with a rotating ballast and configured for rotation about the stator axis, a housing disposed around the rotor and configured to contain the electric machine, and a brake disposed at an inner surface of the housing and configured to absorb kinetic energy of the rotor upon contact of the brake with the rotor.

The rotor may be configured for rotation around the stator. The rotor may be axially spaced from the stator. The rotor may be both axially and radially spaced from the stator. The brake may include a surface having a camber such that a surface area of the brake being contacted increases based on a decrease of spacing between the rotor and the housing. The brake may further include an electrical control system configured to determine spacing between the rotor and the housing and activate a braking operation based on such spacing.

An energy storage device mounted at a horizontal end of a work vehicle for storing energy generated from operation of the work vehicle includes a stator of an electric machine having a stator axis, a rotor of the electric machine fixed for rotation with a rotating ballast and configured for rotation about the stator axis, a housing disposed around the rotor and configured to contain the electric machine, and a brake having a first brake portion disposed at an inner surface of the housing and a second brake portion disposed at an outer surface of the rotor, wherein the brake is configured to absorb kinetic energy of the rotor upon contact of the first brake portion with the second brake portion.

The rotor may be configured for rotation around the stator. The rotor may be axially spaced from the stator. The rotor may be both axially and radially spaced from the stator. The brake may include a surface having a camber such that a surface area of the brake being contacted increases based on a decrease of spacing between the rotor and the housing. The brake may further include an electrical control system configured to determine spacing between the rotor and the housing and activate a braking operation based on such spacing.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one embodiment of the subject matter of this disclosure is understood by referring to FIGS. 1 through 8 of the drawings.

Figure 1:
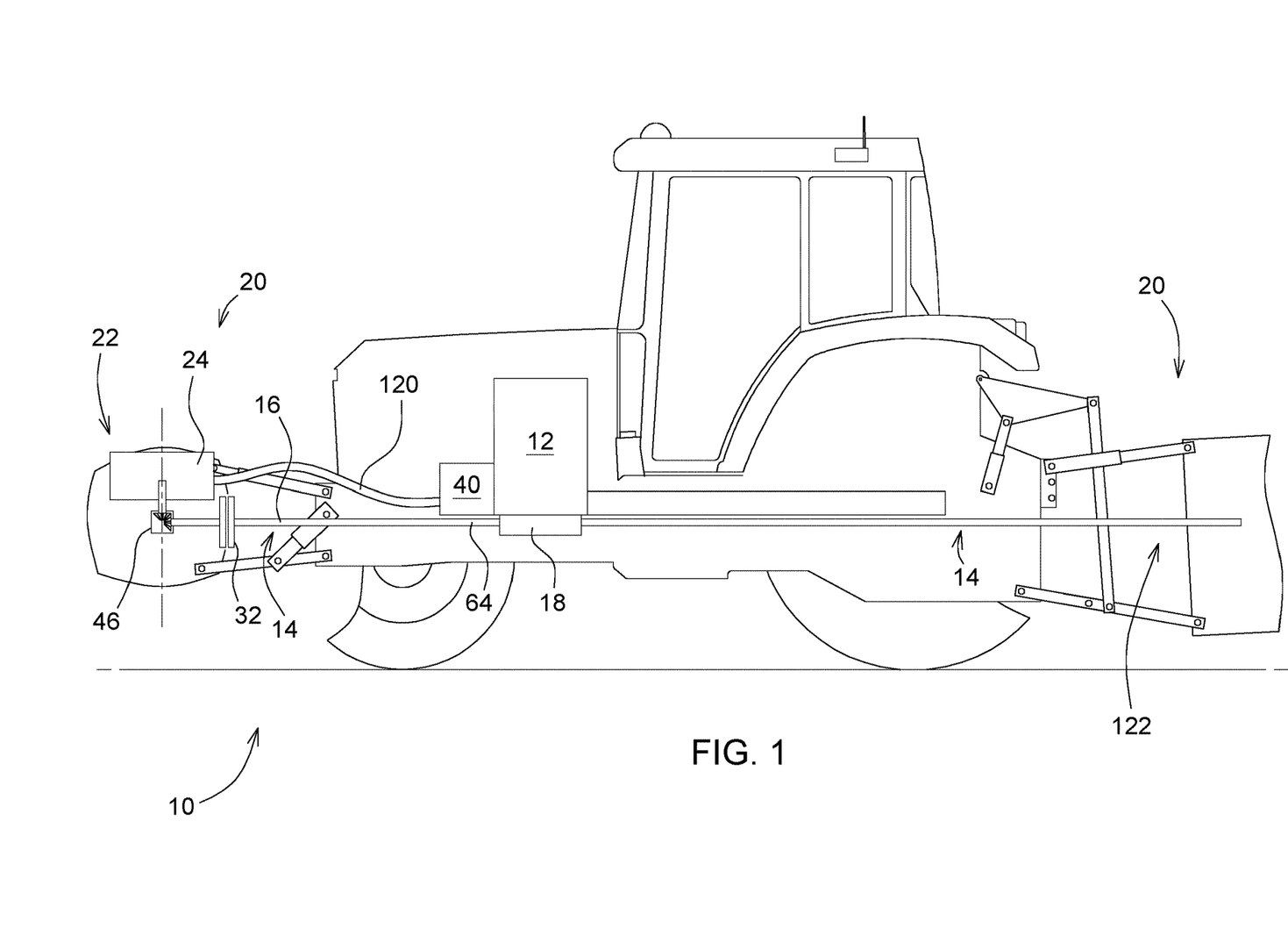
FIG. 1 illustrates a work vehicle in accordance with one or more embodiments of the present disclosure.

Reference is now made to FIG. 1, which illustrates a work vehicle 10 in accordance with one or more embodiments of the present disclosure. The work vehicle 10 of FIG. 1 includes a prime mover 12 such as a diesel internal combustion engine in a non-limiting example. The prime mover 12 includes one or more motors, engines, and/or other devices in one or more additional embodiments to propel or otherwise power the work vehicle 10. In further embodiments not illustrated, the work vehicle 10 does not include the prime mover 12 and/or is a self-powered or unpowered pulled, pushed, or otherwise propelled implement, trailer, or other vehicle. The work vehicle 10 includes a controller 40 in an embodiment configured to control one or more operations of the work vehicle 10 and/or components or systems thereof.

The work vehicle 10 of one embodiment further includes a power takeoff system 14 in an embodiment that is coupled to the prime mover 12. The prime mover 12 may provide power to the power takeoff system 14. The power takeoff system 14 may then provide rotational or other energy to one or more locations onboard or offboard the work vehicle 10. In one or more embodiments, the power takeoff system 14 includes at least one power takeoff shaft 16 and/or at least one clutch 18 to selectively couple the prime mover 12 to the power takeoff system 14 and/or another component of the work vehicle 10.

The work vehicle 10 of the illustrated embodiment further includes a ballast 22 disposed beyond or at an end 20 of the work vehicle 10 providing ballast weight to the end 20 of the work vehicle 10. The end 20 of the work vehicle 10 of FIG. 1 is the front end of the work vehicle 10, but the end 20 of the work vehicle 10 of additional embodiments further or alternatively includes a rear end, as indicated in FIG. 1, or a side of the work vehicle 10 whereby the ballast 22 provides ballast weight to such end(s) and/or side(s) of the work vehicle 10. In one or more embodiments, the end 20 is or includes one or more horizontally outermost surface(s) of the work vehicle 10. In other embodiments, the end 20 refers to a general front, rear, and/or side portion or section of the work vehicle 10 such that the ballast 22 does not form or include a horizontally outermost surface of the work vehicle 10. In an embodiment, the energy storage device 24 defines the end 20 of the work vehicle 10. The ballast weight of the ballast 22 is utilized at one or more of the end(s) 20 to stabilize the work vehicle 10, enhance traction of the work vehicle 10, provide a counterbalance for one or more loads, attachment(s), and/or implement(s) of the work vehicle 10, and/or to otherwise increase weight or downforce at one or more of the end(s) 20 for various purposes.

In accordance with an embodiment of the present disclosure, the work vehicle 10 includes an energy storage device 24. The energy storage device 24 of embodiments described herein may also be referred to as a mechanical battery or simply a battery. The energy storage device 24 of some embodiments is mounted at a horizontal end 20 or horizontal ends 20 of the work vehicle 10 for storing energy generated from operation of the work vehicle 10. The energy storage device 24 stores energy generated from movement, operation, and/or propulsion of the work vehicle 10, such as, in non-limiting examples, through regenerative braking of the work vehicle 10 and/or an attachment or implement thereof, boom, attachment, and/or implement descent or braking relative to the work vehicle 10, waste heat recovery of the prime mover 12, electric machine(s), or other component of the work vehicle 10, and/or direct energy transfer from the prime mover 12 or other energy sources of the work vehicle 10 via mechanical, electrical, or other energy transmission to the energy storage device 24.

Figure 2:
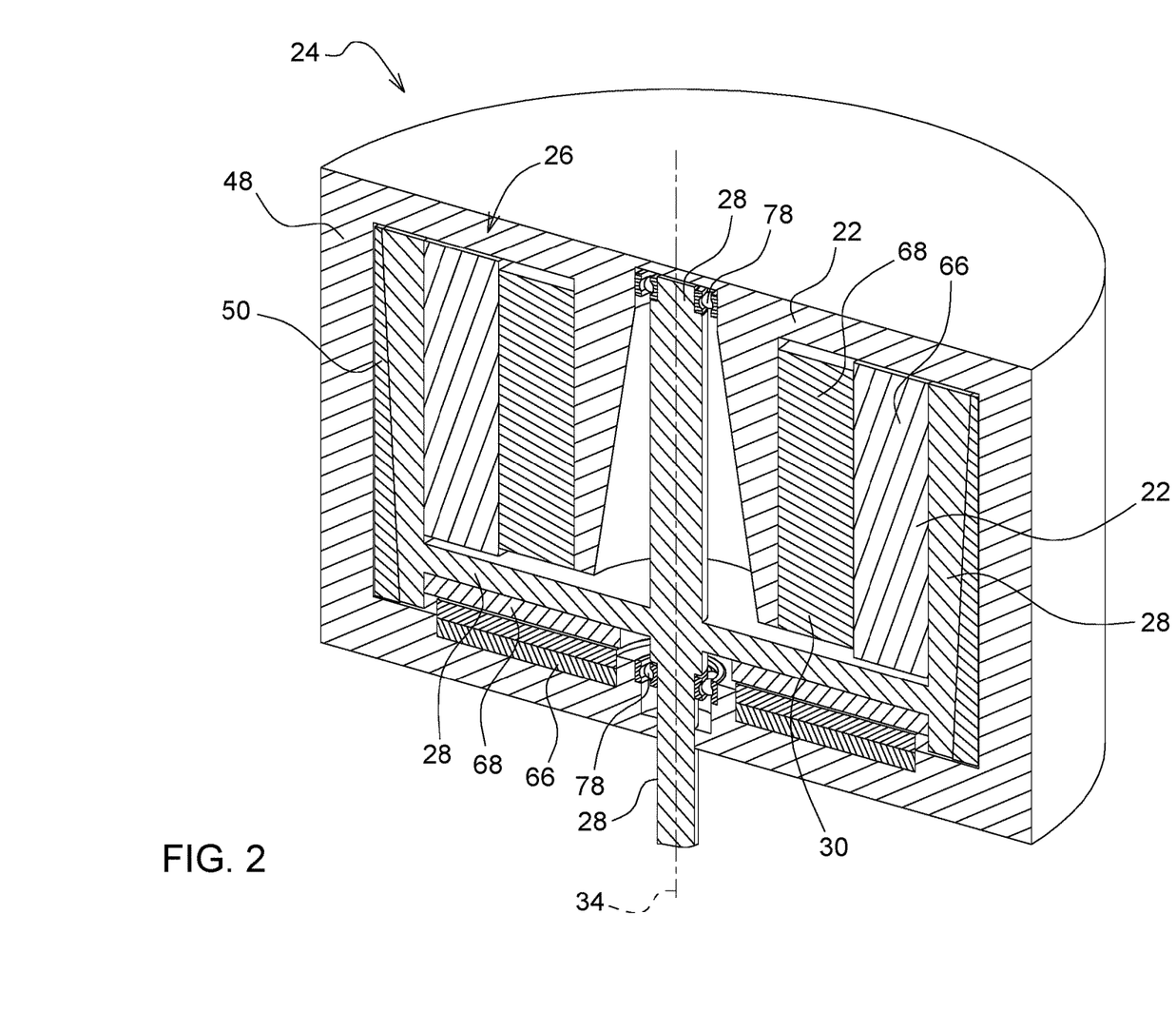
FIG. 2 illustrates an energy storage device in accordance with one or more embodiments of the present disclosure.

Referring now to FIG. 2, the energy storage device 24 includes an electric machine 26 disposed as or in the ballast 22 or includes the ballast 22 such that a rotor 28 of the electric machine 26 provides the ballast weight of the ballast 22. Stated another way, the rotor 28 of the electric machine 26 is fixed for rotation with and/or as the ballast 22. In one or more embodiments, the rotating ballast 22 includes one or more magnetic or other elements on a surface or at a portion thereof, such as on an interior surface of the ballast 22, such that the ballast 22 forms the rotor 28 of the electric machine 26. The ballast 22 may be attached to or integrally formed with the rotor 28 in one or more embodiments to provide the ballast weight such that the ballast 22 is separate from or forms the rotor 28. Accordingly, the rotor 28 acts as a flywheel or similar rotational energy storage device when it rotates as part of the electric machine 26. Accordingly, ballast weight may be referred to, in embodiments of the present disclosure, as rotor mass, and vice versa, and it will be appreciated that "ballast weight" and "rotor mass" may be used interchangeably herein. FIG. 2 illustrates one embodiment where the ballast 22 is both formed by the rotor 28 as a rotating ballast, but the electric machine 26 is formed within or as part of the ballast 22.

As shown in FIG. 1, the power takeoff system 14 is coupled to the prime mover 12. The power takeoff system 14 transmits rotational energy from the prime mover 12 to the rotor 28 of the electric machine 26 in the illustrated embodiments of FIGS. 1 and 2. The power takeoff system 14 of the embodiment shown in FIG. 1 includes a differential, gearbox, or other mechanical energy transfer component 46 to convert a horizontally extending prime mover output 64 to the vertically extending rotor 28, electric machine 26, and/or other component of the energy storage device 24. As illustrated, the power takeoff system 14 of an embodiment extends to the front or rear ends 20 and, therefore, may extend to a rear portion 122 of the power takeoff system 14 at the rear end 20 of the work vehicle 10 to, for example, operate an attachment or implement of the work vehicle 10 in addition to or instead of being connected to an energy storage device 24 located at the rear portion 122.

The work vehicle 10 of an embodiment further includes a clutch 32 selectively coupling the prime mover 12 to the rotor 28 of the electric machine 26 through the power takeoff system 14. When the operator or a controller 40 of the work vehicle 10 engages the clutch 32, the prime mover 12 is coupled to the rotor 28 through the clutch 32. When the operator or a controller 40 of the work vehicle 10 disengages the clutch 32, the prime mover 12 is disconnected from the rotor 28 such that the rotor 28 and the prime mover 12 are not mechanically coupled and freely rotate relative to each other. At least one electrical connection 120 connects the electric machine 26 to the controller 40 and/or the prime mover 12 for transmission of electrical current to/from the controller 40 and/or the prime mover 12. In an embodiment, the electrical connection 120 connects the electric machine 26 to a motor, generator, or motor-generator (not shown) coupled at or with the prime mover 12 for transmission of electrical current thereto and/or therefrom. In one or more embodiments, the electric machine 26 is connected for current transmission for controls and/or power to/from additional portions or components of the work vehicle 10 or energy storage device(s) 24.

A housing 48 is disposed around the rotor 28 to contain the electric machine 26 or contain at least the rotor 28. The housing 48 of FIG. 2 is formed as at least one part of the ballast 22. As indicated in FIG. 2 with broken lines, the rotor 28 of the electric machine 26 may be connected through the housing 48 to the power takeoff system 14 or another connection or may be completely contained within the housing 48. In embodiments where the electric machine 26 is contained completely within the housing 48, the energy storage device 24 would function or be capable to receive and transmit only electrical current or energy as the electric machine 26 in such embodiments is not mechanically connected to the work vehicle 10 or another connection outside of the housing 48. In embodiments where the rotor 28 of electric machine 26 extends through the housing 48 and is connected, in such embodiments, to the power takeoff system 14 or another connection, the energy storage device 24 would function or be capable to receive and transmit both electrical and mechanical energy as will be described in further detail below. The energy storage device 24 of various embodiments herein further may include one or more radial bearings 78 mounted in or to the housing 48 and configured to provide radial support for the rotor 28 as illustrated in the Figures.

The electric machine 26 includes a stator 30 that is stationary relative to the rotor 28, such as being fixed against rotational movement with the work vehicle 10. The stator 30 of an embodiment includes a vertically extending axis 34. In one or more embodiments, the axis 34 is perpendicular or substantially perpendicular within 30 degrees to a horizontally extending chassis of the work vehicle 10. The rotor 28 is configured for rotation about the vertically extending axis 34. In the embodiment illustrated in FIG. 2, the stator 30 is located inboard or radially inward of the rotor 28.

It will be appreciated that the electric machine 26 of various embodiments described herein includes a motor, a generator, or both. The electric machine 26 of one or more embodiments of the present disclosure is an induction machine or other machine that includes ferrous elements, magnetic elements, and/or permanent magnets, such as rare earth magnets, aligned around the axis of rotation of the rotor 28 and/or does not require electrical connections to the rotor 28 in one or more embodiments of the present disclosure. In additional embodiments of the present disclosure, the electric machine 26 includes electrical connections to the rotor 28. In one or more embodiments of the present disclosure, the electric machine 26 is a direct current or alternating current motor, generator, motor-generator, and/or machine, and any combination of features/functions described in this paragraph forms one or more additional embodiments of the present disclosure.

The rotor 28 of the illustrated embodiments include a plurality of permanent magnets or other magnetic elements 68, and the stator 30 includes a plurality of windings 66 configured to convey electrical current and interact with the magnetic elements 68 to move the rotor 28 and/or to generate electrical current through the windings 66 from movement of the rotor 28. It will be appreciated that, in one or more additional embodiments, the rotor 28 and/or the stator 30 of the electric machine 26 is/are configured in accordance with other configurations in the field of electric machines to provide the electric machine 26 being capable of driving the rotor 28 and/or generating electrical current from the movement of the rotor 28, and such configurations form additional embodiments of the present disclosure.

Figure 3:
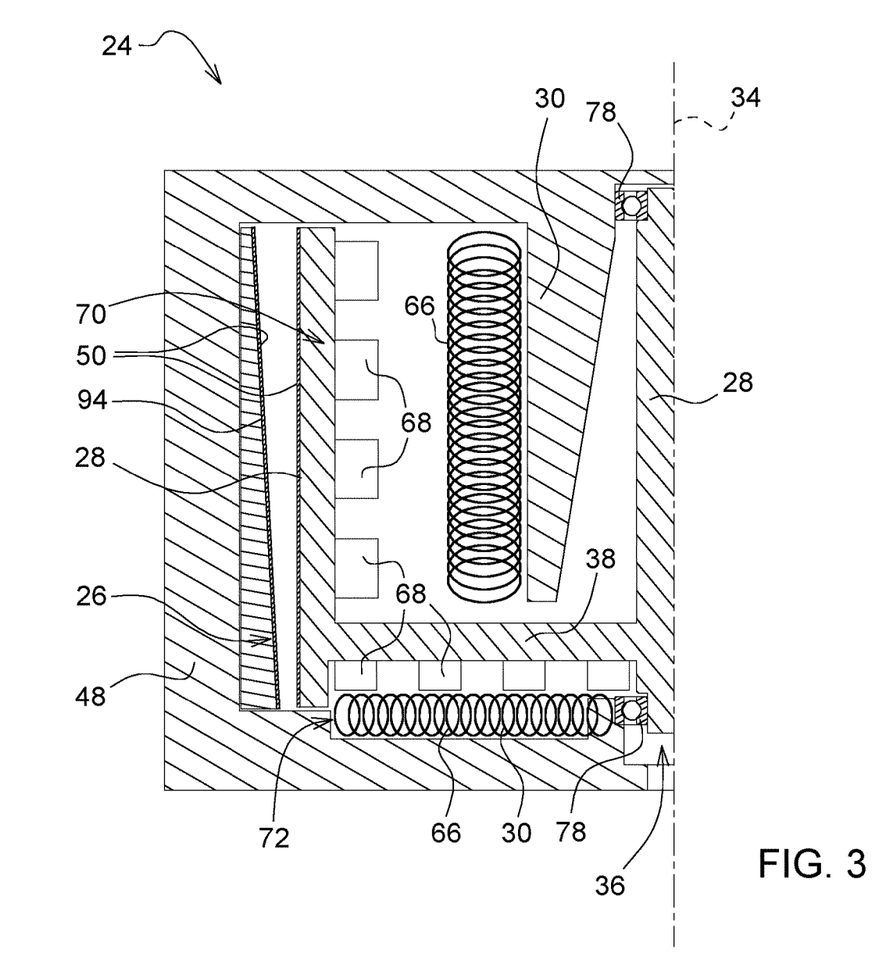
FIG. 3 illustrates an energy storage device in accordance with one or more embodiments of the present disclosure.

FIG. 3 is a partial cross-sectional illustration of one embodiment of the energy storage device 24. The rotor 28 of the energy storage device 24 of the embodiment further includes one or more arms 38 or a plurality of arms 38 extending radially to connect inner and outer portions of the rotor 28. The plurality of arms 38 may be only a single arm configured as a single disk extending radially outward or may include a plurality of radially extending spokes or arms 38 that are each spaced circumferentially from each other. In the embodiment, the stator 30 includes windings 66 disposed inboard of magnetic elements 68 of the rotor 28 in a radial flux portion 70 of the electric machine 26. In the embodiment, the stator 30 further includes the windings 66 disposed axially outboard of the magnetic elements 68 positioned on the arm(s) 38 of the rotor 28 in an axial flux portion 72 of the electric machine 26.

Referring again to FIG. 1, the ballast weight of the ballast 22 and/or the ballast 22 is positioned in one or more embodiments at the end 20 and/or spaced from the end 20 away from the work vehicle 10 in order to increase the ballast effect on the work vehicle 10. In one or more embodiments, the ballast 22 is supported completely by the work vehicle 10 at the end 20 and is not supported by wheels and/or one or more other ground-engaging member(s). In other embodiments not illustrated, the ballast 22 may include one or more ground-engaging members, such as wheels in a non-limiting example.

In an embodiment of the present disclosure, the ballast weight of the ballast 22 and/or the is at least 40 pounds. In another embodiment, the ballast weight of the ballast 22 is at least 70 pounds. In another embodiment, the ballast weight of the ballast 22 is at least 100 pounds. In additional embodiments, the ballast weight of the ballast 22 is less than 40 pounds. The ballast weight is provided by a single ballast 22 in the illustrated embodiment of FIG. 1. The ballast weight is provided by multiple ballasts 22 forming part of multiple energy storage devices 24 in additional embodiments. In any embodiment described herein, ballast weight, such as with a ballast box and/or suitcase weights, may be added to the work vehicle 10 to supplement ballast weight provided by the ballast(s) 22 described herein.

The inertia of the rotor 28 in an embodiment is at least 0.05 kg-m$^2$. The inertia of the rotor 28 in a further embodiment is at least 0.1 kg-m$^2$. The inertia of the rotor 28 in a further embodiment is at least 1 kg-m$^2$. In further embodiments, the inertia of the rotor 28 is increased by increasing the diameter of the rotor 28 and/or increasing the rotational speed of the rotor 28.

In the illustrated embodiments shown in the Figures, the rotor 28, in a first operation, rotates from the flow of electrical current provided to the electric machine 26 in or through the stator 30. The rotor 28, in a second operation, rotates or continues to rotate to store energy in the form of kinetic energy of the work vehicle 10 and/or another energy input. The rotor 28, in a third operation, generates electrical current in or through the stator 30 for the work vehicle 10 or another energy output from rotation of the rotor 28. The rotor 28, in any operation, further provides a rotor mass as ballast and energy storage to the end 20 of the work vehicle 10 in accordance with various embodiments described in the present disclosure.

The mass of the rotor 28 and/or the ballast weight is greater than a mass or weight of the stator 30 in the illustrated embodiment. In a further embodiment, the mass of the rotor 28 and/or the ballast weight is at least three times greater than a mass or weight of the stator 30. In a further embodiment, the mass of the rotor 28 and/or the ballast weight is at least six times greater than a mass or weight of the stator 30. In a further embodiment, the mass of the rotor 28 and/or the ballast weight is at least ten times greater than a mass or weight of the stator 30.

In the illustrated embodiment of FIG. 1, the rotor 28 and/or the ballast 22 is/are shaped cylindrically or otherwise such that the ballast 22 and/or the rotor 28 surrounds the stator 30 or encloses the stator 30. In such an embodiment, the rotor 28 and/or the ballast 22 is/are radially spaced from the stator 30 of the electric machine 26.

Figure 4:
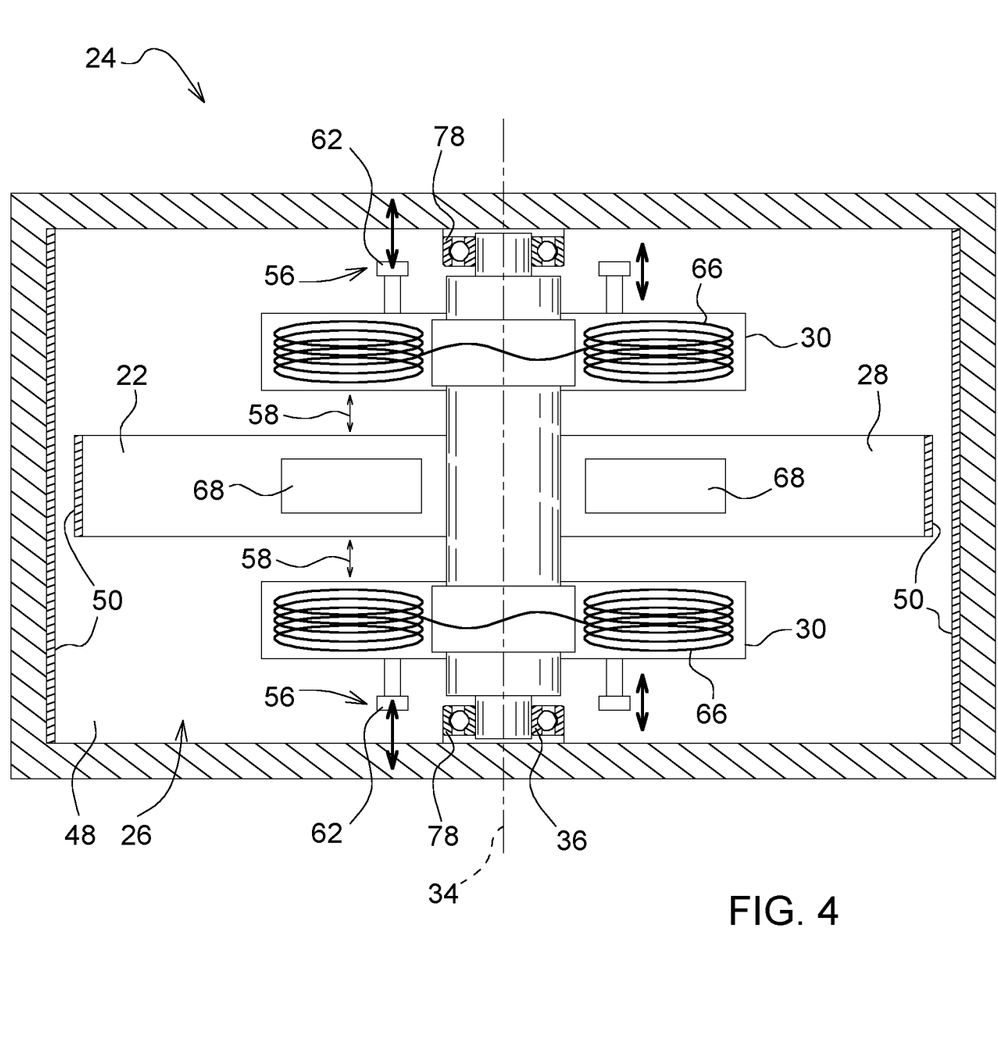
FIG. 4 illustrates an energy storage device in accordance with one or more embodiments of the present disclosure.

Referring now to FIG. 4, in another embodiment, the rotor 28 and/or the ballast 22 include a disk, plate, or planar shape or otherwise such that the ballast 22 and/or the rotor 28 is/are axially spaced from the stator 30, such as in an axial flux electric machine, as a non-limiting example.

Figure 5:
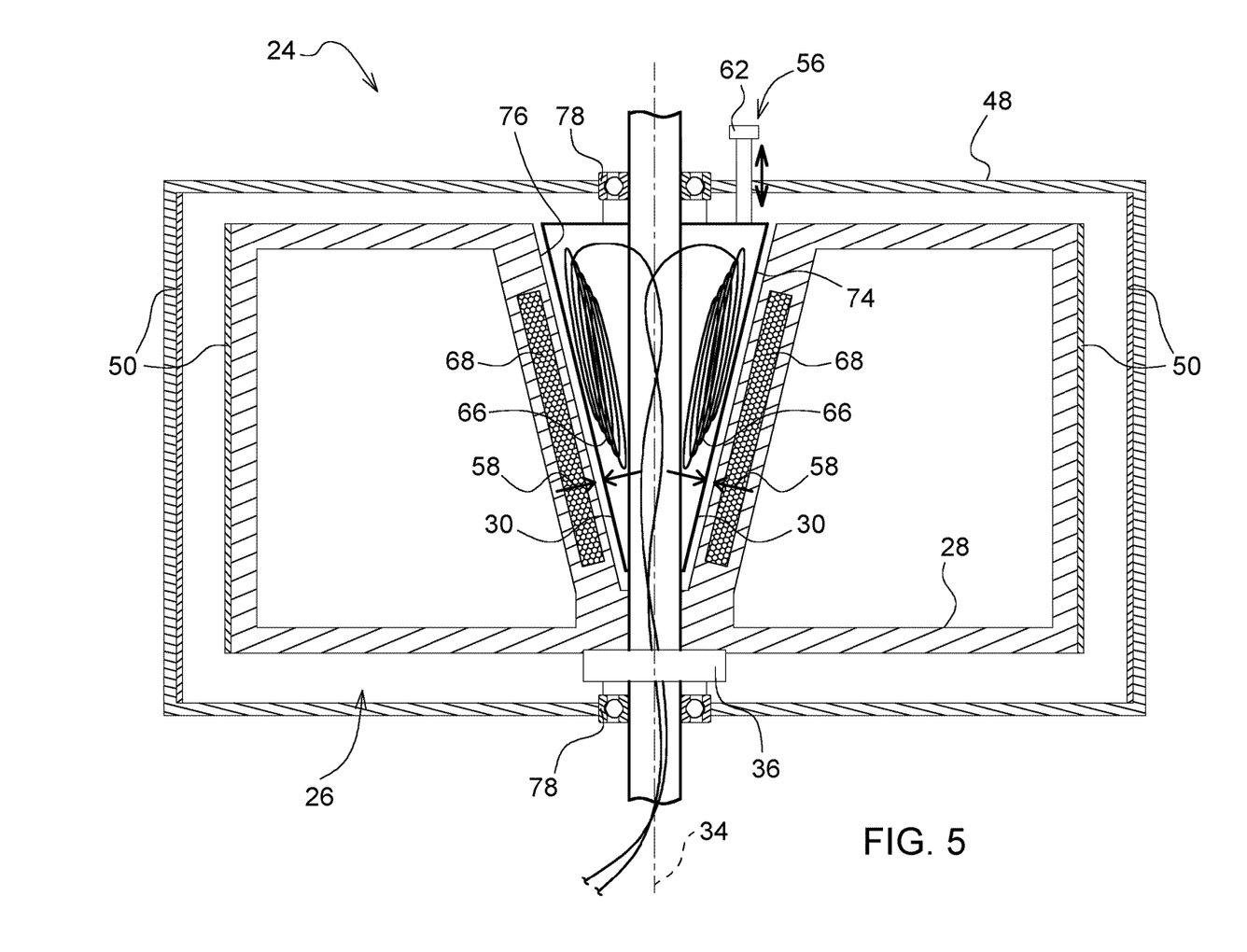
FIG. 5 illustrates an energy storage device in accordance with one or more embodiments of the present disclosure.

Referring now to FIG. 5, in another embodiment, an outer surface 74 of the stator 30 and an inner surface 76 of the rotor 28 are conically shaped such that the ballast 22 and/or the rotor 28 is/are both axially and radially spaced from the stator 30.

The energy storage device 24 further includes a bearing 36 supporting the ballast weight of the ballast 22/rotor 28. The bearing 36 includes one or multiple bearings in accordance with embodiments of the present disclosure and may be supplemental to or formed as one or more of the bearings 78 providing radial support for the rotor 28. The vertical load from the ballast weight described herein forms an axial thrust load from the ballast 22, the rotor 28, and/or the ballast weight in one or more embodiments. Additional loads may be included, but the ballast weight forming the vertical load is primarily an axial thrust load from the ballast 22, the rotor 28, and/or the ballast weight in one or more further embodiments.

Figure 6A:
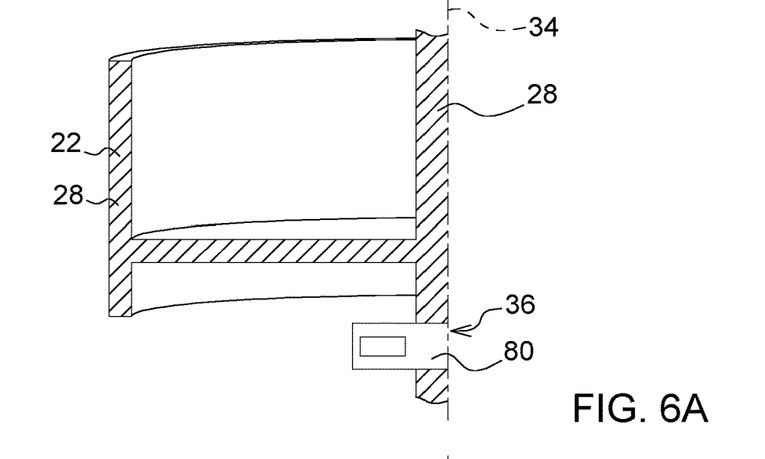
FIGS. 6A-6C illustrate an energy storage device in accordance with one or more embodiments of the present disclosure.

Referring to FIG. 6A, in an embodiment, the bearing 36 is a thrust bearing 80 to provide vertical support for and/or receive vertical load from the ballast weight. The thrust bearing 80 may supplement or be incorporated into the radial bearing 78 in such embodiments that include the radial bearing 78. The thrust bearing 80 is a deep groove ball bearing in an embodiment, may include roller elements either in-line or tapered to the axis 34 in additional embodiments, and/or other structure/functions to control the forces of the ballast 22, the rotor 28, and/or other components of the energy storage device 24.

Figure 6B:
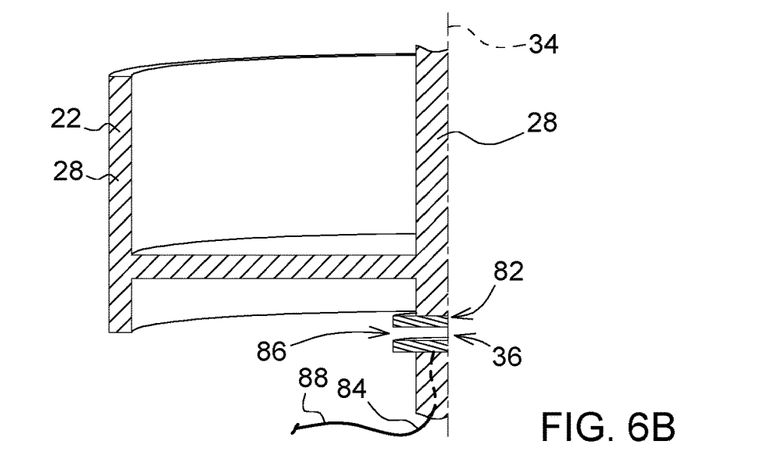

Referring to FIG. 6B, in an embodiment, the bearing 36 is an electromagnetic bearing 82 electrically coupled to the electric machine 26 to provide vertical support for and/or receive vertical load from the ballast weight with electromagnetic force. In such embodiments, the electromagnetic bearing 82 includes one or more electrical connections 84 to the electric machine 26 and/or another electrical current-providing connection to provide the energy to generate the electromagnetic force.

Referring again to FIG. 6B, in an embodiment, the bearing 36 is a hydrodynamic bearing 86 to provide vertical support for and/or receive vertical load from the ballast weight with fluid force. The hydrodynamic bearing has or receives pressurized fluid via one or more hydraulic lines 88 to provide the fluid force, such as from a hydraulic system of the work vehicle 10. In further embodiments not illustrated, the bearing 36 is a magnetic bearing, fluid bearing, and/or another bearing type that eliminates or reduces contact between the stationary and rotating components of the bearing 36.

Figure 6C:
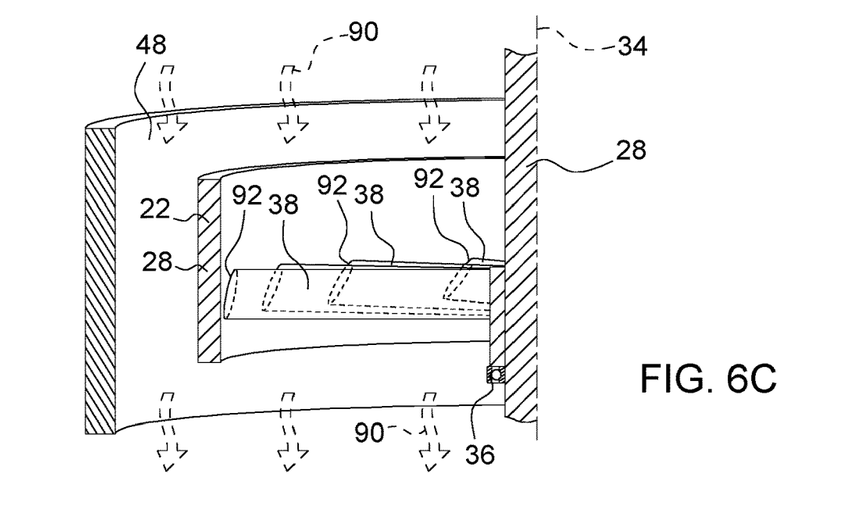

Referring now to FIG. 6C, as described in earlier embodiments, the energy storage device 24 of an embodiment may further include the plurality of arms 38 extending radially between portions of the rotor 28. Each of the plurality of arms 38 is shaped, designed, positioned, oriented, or otherwise configured to move air vertically through the rotor 28 and/or the electric machine 26 in an embodiment. In such embodiments where the housing 48 is provided around the electric machine 26, the housing 48 includes venting, is open at axial ends 90 of the housing 48, and/or is otherwise configured to allow air to move vertically or axially relative to the rotor 28 through the housing 48 and/or the electric machine 26.

In the embodiment illustrated in FIG. 6C, each of the plurality of arms 38 comprises an airfoil cross-section 92 to move air vertically through the rotor 28. The airfoil cross-section of the arms 38 of an embodiment push, pull, or otherwise move air vertically upward in an embodiment, thereby creating a reaction force on the rotor 28 in a downward direction to increase ballast weight for the ballast 22/rotor 28 and work vehicle 10, but also increase vertical load on the bearing 36. The airfoil cross-section of the arms 38 of an embodiment push, pull, or otherwise move air vertically downward in an embodiment, thereby creating a reaction force on the rotor 28 in an upward direction to decrease ballast weight for the ballast 22/rotor 28 and work vehicle 10, but also decrease vertical load on the bearing 36. Movement of air through the rotor 28 of the electric machine 26 with the arms 38 further increases cooling of the electric machine 26 or another component of the work vehicle 10 as the air may be moved against and/or across the rotor 28, the stator 30, the bearing 36, and/or additional components of the energy storage device 24 or one or more component(s) of the work vehicle 10.

In an embodiment, the airfoil cross-section 92 and/or the arm(s) 38 include a variable pitch control such that a pitch angle of one or more of the arm(s) 38 changes to increase, decrease, and/or reverse direction of air flow. It will be appreciated that such control may allow the arms 38 of the energy storage device 24 to move air vertically upward or downward at a targeted and/or variable rate based on desired load on the bearing 36, a desired additional ballast force for the ballast 22/rotor 28, and/or a desired cooling effect from the movement of air from the arms 38.

It will be appreciated that the embodiments of FIGS. 6A-6C are not exclusive to each other, and two or more of these embodiments or structures or features thereof may be implemented in the energy storage device 24 of one or more embodiments.

Referring again to FIGS. 2-5, the energy storage device 24 is mounted at the horizontal end 20 of the work vehicle 10 for storing energy generated from operation of the work vehicle 10 in a non-limiting embodiment. The energy storage device 24 includes the rotor 28 fixed for rotation with the rotating ballast 22 and configured for rotation around or against the stator 30 about the stator axis 34 and a housing 48 disposed around the rotor 28 to contain the electric machine 26 or contain at least the rotor 28. The energy storage device 24 of the illustrated embodiments of FIGS. 2-5 further includes a brake 50 disposed at an outer surface 52 of the rotor 28 and/or the inner surface 54 of the housing 48. The brake 50 includes structure and/or materials configured to absorb kinetic energy of the rotor 28 upon contact of the brake 50 with the housing 48 in embodiments where the brake 50 is provided only on the rotor 28, upon contact of the brake 50 with the rotor 28 in embodiments where the brake 50 is provided only on the housing 48, or upon contact of the brake 50 with another portion of the brake 50 in embodiments where the brake 50 is provided on both the rotor 28 and the housing 48.

The brake 50 of one or more embodiments includes a friction material, including without limitation a friction material adapted to withstand higher temperatures compared to the materials of the housing 48 and/or the rotor 28. In an embodiment, the brake 50 includes a drum brake material and/or any other composite and/or ceramic. In one or more embodiments, the brake 50 or the friction material of the brake 50 consists of or includes Kevlar, carbon fibers, aramid, ceramic matrix composite, reinforced carbon-carbon, gray iron, carbon fiber-reinforced polymers, basalt fiber, phenol resin, steel fiber, graphite, cellulose, polyacrylonitrile, and/or copper materials to name non-limiting examples. In one or more embodiments, such as that illustrated in FIG. 3, the brake 50 is configured as a tapered or conical shape, or has a surface with a camber 94, such that more surface area of the brake 50 is contacted based on a decrease of spacing between the rotor 28 and the housing 48. It will be appreciated that the surface having the camber 94 may include the brake 50 being formed on or with the housing 48, the rotor 28, or both. In a further embodiment, the brake 50 includes one or more resilient or compliant surface features, which may be sacrificial in an embodiment, and which may be made from friction materials or the materials of the rotor 28 and/or the housing 48 in an embodiment, including one or more porous or radially extending walls or other features that absorb the kinetic energy of the rotor 28 and thereby slow the rotation of the rotor 28.

In a further embodiment of the present disclosure, the brake 50 may include an electrical braking feature. In the embodiment, the brake 50 may include a control system or be connected to the controller 40 to include sensing of spacing, contact or potential contact between the rotating rotor 28, the housing 48, and/or any portion of the brake 50 located thereon. In an embodiment, the control system of the brake 50 and/or the controller 40 will immediately generate current from the electric machine 26 upon sensing or otherwise determining that contact will occur or is likely to occur. The system may sense or determine that immediate braking is required based on one or more rotor or housing position, speed, and/or vibration sensor(s) and/or an internal electrical control circuit that closes upon contact between the rotor 28, the housing 48, and/or any portion of the brake 50 to name non-limiting examples. Such electrical current discharged from the rotor 28 may be immediately dumped into a brake resistor, fed back to the prime mover 12, such as via an electric machine directly coupled to a diesel engine, a three-phase short at the power electronics of the energy storage device 24 to name non-limiting examples. In at least one embodiment, the electrical braking system may further release or activate a rotor brake actuator upon sensing or determining that immediate braking is required.

It will be appreciated that any features of the brake 50 described with regard to any illustrated embodiments may be included in any combination with other embodiments of the energy storage device 24 described herein.

Figure 7:
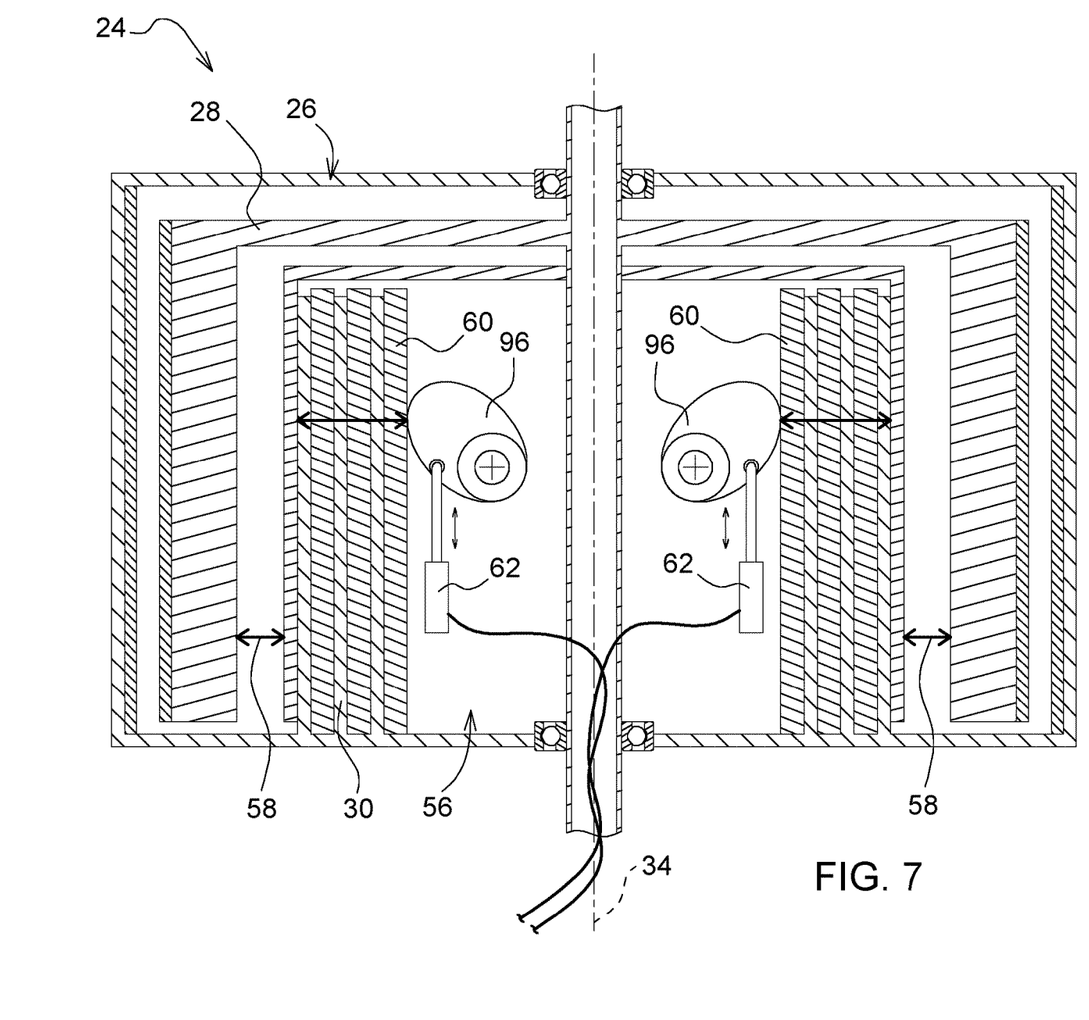
FIG. 7 illustrates an energy storage device in accordance with one or more embodiments of the present disclosure.

Referring now to FIG. 7 with continuing reference to FIGS. 4 and 5, the energy storage device 24 includes a gap modulator 56 coupled to the stator 30 and/or the rotor 28. The rotor 28 of the electric machine 26 is spaced from the stator 30 in the illustrated embodiments by a gap 58. The gap modulator 56 selectively adjusts the gap 58 between the rotor 28 and the stator 30 based on an operation of the electric machine 26.

If an operation of the energy storage device 24 requires the electric machine 26 to operate as an electric motor whereby electrical current is input into the energy storage device 24 to rotate the rotor 28 or operate as a generator whereby electrical current is generated and output from the energy storage device 24 by rotation of the rotor 28, the gap modulator 56 will reduce the gap 58. Reducing the gap 58 in such operations increases the magnetic coupling between the rotor 28 and the stator 30 and increases the efficiency of the electric machine 26, thereby increasing energy stored in the energy storage device 24 and increasing energy output from the energy storage device 24 during such operations. If an operation of the energy storage device 24 requires the rotor 28 of the electric machine 26 to operate as a flywheel to store energy and neither receive nor supply electrical current, the gap modulator 56 will increase the gap 58. Increasing the gap 58 in such operations reduces magnetic coupling between the rotor 28 and the stator 30, reduces the electromagnetic drag on the rotor 28, and slows energy loss from the energy storage device 24 over time.

The energy storage device 24 of an embodiment, such as a radial flux machine like that shown in FIG. 7, wherein the rotor 28 and/or the stator 30 has/have a cylindrical shape, includes the rotor 28 and the stator 30 being radially spaced apart by the gap 58. The gap modulator 56 selectively adjusts the gap 58 between the rotor 28 and the stator 30 by moving the rotor 28 and/or the stator 30 in a radial direction. In the non-limiting embodiment of FIG. 7, the stator 30 includes a plurality of winding sections 60 circumferentially spaced from each other. In the embodiment, one or more actuator(s) 62 of the gap modulator 56 move(s) each of the plurality of winding sections 60 toward or away from the rotor 28 to decrease or increase the gap 58. In additional embodiments not shown, the gap modulator 56 moves one or more sections or portions of the rotor 28 radially instead of or in addition to movement of the winding sections 60 of the stator 30. In the embodiment of FIG. 7, each actuator 62 drives a cam 96 pivotally fixed to the stator 30 to translate axial movement from the actuator 62 into radial movement against the stator 30. Although not illustrated, a biasing, such as by spring force, may be provided to the winding sections 60 to return each section 60 to a radially inward position.

Referring again to FIG. 4, the energy storage device 24 of another embodiment, such as the axial flux machine illustrated in FIG. 4, wherein the rotor 28 and/or the stator 30 has/have a planar shape, includes the rotor 28 and the stator 30 being axially spaced apart by the gap 58. The gap modulator 56 selectively adjusts the gap 58 between the rotor 28 and the stator 30 by moving the rotor 28 and/or the stator 30 in an axial direction. In a non-limiting embodiment, the stator 30 is configured as a disk that is moved axially toward or away from the rotor 28 to decrease or increase the gap 58 by the gap modulator 56. Although the energy storage device 24 of FIG. 4 illustrates two portions of the stator 30 with two gap modulators 56, it will be appreciated that, in additional embodiments, only one portion of the stator 30 is provided at an axial side of the rotor 28 with a single gap modulator 56 provided to control a single gap 58 between the rotor 28 and the stator 30.

Referring again to FIG. 5, the energy storage device 24 of another embodiment, such as in an electric machine 26 wherein the stator 30 and the inner surface 76 of the rotor 28 are conically shaped, includes the rotor 28 and the stator 30 being both radially and axially spaced apart by the gap 58. The gap modulator 56 selectively adjusts the gap 58 between the rotor 28 and the stator 30 by moving the rotor 28 and/or the stator 30 in an axial direction. In a non-limiting embodiment, the stator 30 is conically shaped and moved axially toward or away from the rotor 28 to decrease or increase the gap 58 by the gap modulator 56.

In one or more embodiments described herein, the operation of the electric machine 26 includes operation as a generator whereby the gap modulator 56 is configured to reduce the gap 58 between the rotor 28 and the stator 30. In additional embodiments, operation of the electric machine 26 includes operation as a motor whereby the gap modulator 56 is configured to reduce the gap 28 between the rotor 28 and the stator 30. In additional embodiments, operation of the electric machine 26 includes operation as a flywheel whereby the gap modulator 56 is configured to increase the gap 58 between the rotor 28 and the stator 30.

Figure 8:
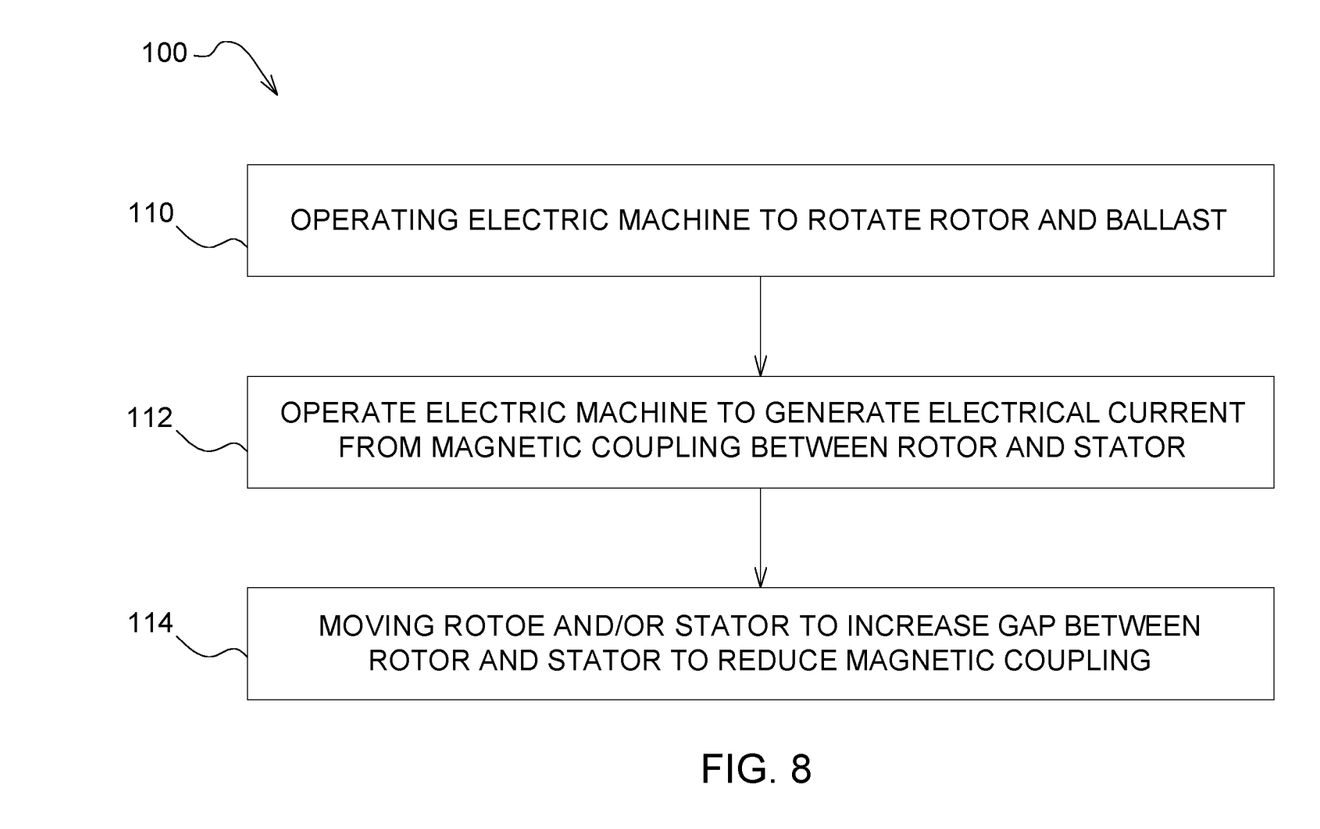
FIG. 8 is a method of adjusting a gap in accordance with one or more embodiments of the present disclosure.

Referring now to FIG. 8, a method 100 of adjusting the gap 58 between the rotor 28 and the stator 30 of the electric machine 26 is illustrated. The method 100 includes operating, at step 110, the electric machine 26 to rotate the rotor 26 and the ballast 22 with electrical current provided to the electric machine 26. The method 100 further includes operating, at step 112, the electric machine 26 to generate electrical current from a magnetic coupling between the rotor 28 and the stator 30 and the inertia, rotational inertia, or rotation of the rotor 28 and the ballast 22 relative to the stator 30. The electrical current is generated in an embodiment from the magnetic coupling and the freewheeling rotor 28 and/or ballast 22. The method 100 further includes moving, at step 114, the rotor 28 and/or the stator 30 to increase the gap 58 between the rotor 28 and the stator 30 to reduce the magnetic coupling between the rotor 28 and the stator 30.

The method 100 of an embodiment includes moving the rotor 28 and/or the stator 30 in a radial direction to increase the gap 58 between the rotor 28 and the stator 30 to reduce the magnetic coupling between the rotor 28 and the stator 30, such as with a radial flux electric machine as described in embodiments herein.

The method 100 of an embodiment further includes moving the rotor 28 and/or the stator 30 in an axial direction to increase the gap 58 between the rotor 28 and the stator 30 to reduce the magnetic coupling between the rotor 28 and the stator 30, such as with an axial flux electric machine or a conically shaped electric machine as described in embodiments herein.

The method 100 of an embodiment includes moving the rotor 28 and/or the stator 30 in a radial direction to decrease the gap 58 between the rotor 28 and the stator 30 to increase the magnetic coupling between the rotor 28 and the stator 30, such as with a radial flux electric machine as described in embodiments herein.

The method 100 of an embodiment further includes moving the rotor 28 and/or the stator 30 in an axial direction to decrease the gap 58 between the rotor 28 and the stator 30 to increase the magnetic coupling between the rotor 28 and the stator 30, such as with an axial flux electric machine or a conically shaped electric machine as described in embodiments herein.

The method 100 of various embodiments described herein includes one or more steps, structures, and/or features of any embodiment of the work vehicle 10 and/or the energy storage device 24 described in the present disclosure in further embodiments. Similarly, any embodiment of the work vehicle 10 and/or the energy storage device 24 includes one or more steps, structures, and/or features described with regard to any embodiment of the method 100 in further embodiments. Any steps, structures, and/or features of any embodiment of the work vehicle 10 and/or the energy storage device 24 described herein may be utilized in addition to or instead of any other steps, structures, and/or features of one or more other embodiments described herein to form one or more additional embodiments of the present disclosure.

The work vehicle 10 and/or the energy storage device 24 of embodiments described herein improves the stability and operation of the work vehicle 10 due to the gyroscopic inertial effect of the rotor 28 and ballast 22. The rotational inertia of the rotor 28 and ballast 22 connected to the work vehicle 10 allow the work vehicle 10 to resist undesirable movement, such as rolling and/or rearward and/or forward tilting in non-limiting examples, while also enhancing the ability to yaw or turn the work vehicle 10. In an embodiment, the controller 40 modulates or otherwise controls a variable rotational speed of the rotor 28 and ballast 22 in order to change or otherwise control the amount of inertia provided by the rotor 28 and the ballast 22, and thereby control the amount or degree of such inertial effects.

The rotor 28 and the ballast 22 of the energy storage device 24 rotate to store energy as kinetic energy converted and/or received via electrical or mechanical connection to other components of the work vehicle 10 and/or an attachment or implement of the work vehicle 10. In one or more additional embodiments, the energy storage device 24 and any component of the energy storage device 24 described in embodiments herein is/are mounted or otherwise connected to an attachment or implement separate from the work vehicle 10. Such an attachment or implement may be connected or connectable to the work vehicle 10 via hitch, power takeoff connection, and/or other coupling devices, and/or the work vehicle 10 may control and/or transmit and/or receive energy via hydraulic, pneumatic, electrical, mechanical, and/or other means to/from the attachment or implement.

It will be appreciated that the rotor 28 and the ballast 22 of the energy storage device 24 store and provide and/or receive energy to/from the work vehicle 10 or another component/location via electrical or mechanical connection. In particular embodiments, the energy storage device 24 has a two-way electrical connection and/or a two-way mechanical connection to the work vehicle 10 or another component/location in accordance with the embodiments described.

In non-limiting examples, the energy stored in the energy storage device 24 is supplied to the work vehicle 10 to supplement propulsion, such as when an implement is working or traveling through dense soil, and/or supplement power to lift a boom and/or rotate a power takeoff shaft of the work vehicle 10 when a load on the work vehicle 10, boom, shaft, and/or other component increases above a threshold load amount. Such transmission of energy from the energy storage device 24 to the drivetrain, loaded component, or other location of the work vehicle 10 or elsewhere occurs via electrical wiring connection, hydraulic, pneumatic, and/or mechanical shaft, gearing, coupling, or similar means.

It will be appreciated that the energy storage device 24 of additional embodiments may include a hydraulic or pneumatic motor/pump in addition to or instead of the electric machine 26 described in the present embodiments to receive and/or provide energy to/from the ballast 22 of the energy storage device 24.

It will be appreciated that the energy storage device 24 of embodiments disclosed herein provides an energy storage device having a longer life, without charge cycle limits, and being more durable, more recyclable, less temperature sensitive, and less expensive than a chemical battery or other forms of energy storage. Further, the energy storage device 24 of embodiments disclosed herein does not require a separate charge controller, thermal management, and other requirements of a chemical battery or other forms of energy storage. Further still, the energy storage device 24 provides additional beneficial mass as ballast weight to the work vehicle 10, while chemical batteries and other conventional energy storage devices are designed to minimize mass.

It will be appreciated that rotors of electric machines of conventional applications benefit from lower mass and inertia than the embodiments described herein, such as to improve shift development, drivetrain and/or vehicle reversals, and/or overall electric machine component and assembly durability, efficiency, and cost. In contrast, the energy storage device 24 provides a higher inertia and/or mass according to embodiments herein compared to conventional arrangements to provide the benefit of energy storage and ballast weight for the work vehicle 10. The higher inertia and/or mass incorporated into the electric machine 26 further provide a high rate of energy charge and energy discharge and beneficial gyroscopic effects not provided by conventional arrangements and methods.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An energy storage device mounted at an end of a horizontally extending chassis of a work vehicle for storing energy generated from operation of the work vehicle, the energy storage device comprising:
   a stator of an electric machine having a stator axis extending in a vertical direction;
   a rotor of the electric machine extending in the vertical direction, fixed for rotation with a rotating ballast and configured for rotation about the stator axis extending in the vertical direction, the rotor configured for rotation about the stator and creating a vertical load rotating about the stator axis;
   a housing disposed around the rotor and configured to contain the electric machine;
   a brake disposed at an outer surface of the rotor and configured to absorb kinetic energy of the rotor upon contact of the brake with the housing, the brake including a tapered surface extending about the stator axis; and
   a thrust bearing supporting the vertical load rotating about the stator axis, the thrust bearing configured to apply an electromagnetic force or a hydrodynamic force to the rotor and to change a position of the rotor along the stator axis, wherein a decrease in the electromagnetic force or the hydrodynamic force applied to the rotor facilitates contact of the tapered surface of the brake with the housing.

2. The energy storage device of claim 1, wherein the rotor is axially spaced from the stator.

3. The energy storage device of claim 1, wherein the rotor is both axially and radially spaced from the stator.

4. The energy storage device of claim 1, wherein the a surface area of the tapered surface of the brake being contacted increases based on a decrease of spacing between the rotor and the housing.

5. The energy storage device of claim 1, wherein the brake further includes an electrical control system configured to determine spacing between the rotor and the housing and activate a braking operation based on such spacing.

6. The energy storage device of claim 1, wherein the rotor comprises a plurality of magnets and the stator comprises a plurality of windings to form the electric machine, and wherein the brake is disposed around the plurality of magnets of the rotor of the electric machine.

7. An energy storage device mounted at an end of a horizontally extending chassis of a work vehicle for storing energy generated from operation of the work vehicle, the energy storage device comprising:
   a stator of an electric machine having a stator axis extending in a vertical direction;
   a rotor of the electric machine extending in the vertical direction, fixed for rotation with a rotating ballast and configured for rotation about the stator axis extending in the vertical direction and creating a vertical load rotating about the stator axis;
   a housing disposed around the rotor and configured to contain the electric machine; and
   a brake disposed at an inner surface of the housing and configured to absorb kinetic energy of the rotor upon contact of the brake with the rotor, the brake including a tapered surface extending about the stator axis; and
   a thrust bearing supporting the vertical load rotating about the stator axis, the thrust bearing configured to apply an electromagnetic force or a hydrodynamic force to the rotor and to change a position of the rotor along the stator axis, wherein a decrease in the electromagnetic force or the hydrodynamic force applied to the rotor facilitates contact of the tapered surface of the brake with the housing.

8. The energy storage device of claim 7, wherein the rotor is axially spaced from the stator.

9. The energy storage device of claim 7, wherein the rotor is both axially and radially spaced from the stator.

10. The energy storage device of claim 7, wherein a surface area of the tapered surface of the brake being contacted increases based on a decrease of spacing between the rotor and the housing.

11. The energy storage device of claim 7, wherein the brake further includes an electrical control system configured to determine spacing between the rotor and the housing and activate a braking operation based on such spacing.

12. The energy storage device of claim 7, wherein the rotor comprises a plurality of magnets and the stator comprises a plurality of windings to form the electric machine, and wherein the brake is disposed around the plurality of magnets of the rotor of the electric machine.

13. An energy storage device mounted at an end of a horizontally extending chassis of a work vehicle for storing energy generated from operation of the work vehicle, the energy storage device comprising:
   a stator of an electric machine having a stator axis extending in a vertical direction;
   a rotor of the electric machine extending in a vertical direction fixed for rotation with a rotating ballast and configured for rotation about the stator axis extending in a vertical direction and creating a vertical load rotating about the stator axis;
   a housing disposed around the rotor and configured to contain the electric machine; and
   a brake having a first brake portion disposed at an inner surface of the housing and a second brake portion disposed at an outer surface of the rotor, wherein the brake is configured to absorb kinetic energy of the rotor upon contact of the first brake portion with the second brake portion, the brake including a tapered surface extending about the stator axis; and a thrust bearing supporting the vertical load rotating about the stator axis, the thrust bearing configured to apply an electromagnetic force or a hydrodynamic force to the rotor and to change a position of the rotor along the stator axis, wherein a decrease in the electromagnetic force or the hydrodynamic force applied to the rotor facilitates contact of the tapered surface of the brake with the housing.

14. The energy storage device of claim 13, wherein the rotor is axially spaced from the stator.

15. The energy storage device of claim 13, wherein the rotor is both axially and radially spaced from the stator.

16. The energy storage device of claim 13, wherein a surface area of the tapered surface of the brake being contacted increases based on a decrease of spacing between the rotor and the housing.

17. The energy storage device of claim 13, wherein the brake further includes an electrical control system configured to determine spacing between the rotor and the housing and activate a braking operation based on such spacing.

18. The energy storage device of claim 13, wherein the rotor comprises a plurality of magnets and the stator comprises a plurality of windings to form the electric machine, and wherein the brake is disposed around the plurality of magnets of the rotor of the electric machine.

\* \* \* \* \*